United States Patent
Kumar

(10) Patent No.: US 9,038,669 B2
(45) Date of Patent: May 26, 2015

(54) SYSTEMS AND METHODS FOR MANAGING PRESSURE AND FLOW RATE

(75) Inventor: Sunil Kumar, Delhi (IN)

(73) Assignee: SUNITA RANI, Delhi (IN)

( * ) Notice: Subject to any disclaimer, the term of this patent is extended or adjusted under 35 U.S.C. 154(b) by 740 days.

(21) Appl. No.: 12/369,006

(22) Filed: Feb. 11, 2009

(65) Prior Publication Data

US 2009/0199656 A1 Aug. 13, 2009

Related U.S. Application Data

(60) Provisional application No. 61/028,002, filed on Feb. 12, 2008.

(51) Int. Cl.
*F15D 1/04* (2006.01)
*F16L 55/027* (2006.01)

(52) U.S. Cl.
CPC ...... *F16L 55/02718* (2013.01); *Y10T 29/49826* (2015.01)

(58) Field of Classification Search
USPC .......................................... 138/26, 46; 73/707
See application file for complete search history.

(56) References Cited

U.S. PATENT DOCUMENTS

| | | | | |
|---|---|---|---|---|
| 2,125,245 A * | 7/1938 | McCray | ............................ | 138/42 |
| 2,400,161 A * | 5/1946 | Allerton et al. | ................... | 138/42 |
| 2,593,315 A * | 4/1952 | Kraft | ................................ | 138/45 |
| 2,899,981 A * | 8/1959 | Binks | .............................. | 138/46 |
| 2,965,695 A * | 12/1960 | Sleicher, Jr. | .................. | 585/742 |
| 3,526,391 A * | 9/1970 | Church, Jr. | ..................... | 366/340 |
| 3,581,773 A * | 6/1971 | Warren | ............................. | 138/26 |
| 3,586,104 A * | 6/1971 | Hyde | .............................. | 166/142 |
| 3,665,965 A * | 5/1972 | Baumann | ......................... | 138/42 |
| 3,840,051 A | 10/1974 | Akashi et al. | | |
| 4,514,095 A | 4/1985 | Ehrfeld et al. | | |
| 5,327,941 A * | 7/1994 | Bitsakis et al. | ................. | 138/42 |
| 5,819,803 A * | 10/1998 | Lebo et al. | ....................... | 138/42 |
| 6,530,684 B1 * | 3/2003 | Kolb et al. | .................. | 366/176.1 |
| 6,615,874 B2 * | 9/2003 | Thurston et al. | ................ | 138/42 |
| 7,766,045 B2 * | 8/2010 | Fagerlund et al. | .............. | 138/42 |
| 2003/0136454 A1 * | 7/2003 | Thurston et al. | ................ | 138/42 |

FOREIGN PATENT DOCUMENTS

EP 434106 A1 6/1991
IN 1516/DEL/2005 12/2006

OTHER PUBLICATIONS

PCT—International Search Report—PCT/IN2009/000102, Aug. 20, 2009, 3 pp, WIPO.
PCT—Written Opinion of The International Searching Authority—PCT/IN2009/000102, Aug. 12, 2010, 5 pp, WIPO.

* cited by examiner

*Primary Examiner* — Patrick F Brinson

(57) ABSTRACT

A device for controlling fluid flow pressure and flow rate is disclosed. The device includes a first orifice plate, a second orifice plate housed in a tubular structure. The first orifice plate includes a first orifice of a first diameter (d1) and the first orifice is positioned near an edge of the first orifice plate. The second orifice plate includes a second orifice of a second diameter (d2) and the second orifice is positioned near an edge of the second orifice plate. The tubular structure has an effective diameter (D) comprising the first orifice plate and the second orifice plate placed at perpendicular direction to the fluid flow within the tubular structure, separated by an optimum distance (X).

20 Claims, 4 Drawing Sheets

SYSTEMS AND METHODS FOR MANAGING PRESSURE AND FLOW RATE

CROSS REFERENCE TO RELATED APPLICATIONS

This application claims the benefit of U.S. Provisional Patent Application No. 61/028,002, filed Feb. 12, 2008, titled "SYSTEMS AND METHODS FOR MANAGING PRESSURE AND FLOW RATE".

BACKGROUND OF THE INVENTION

1. Field of the Invention

Embodiments of the present invention relate to fluid flow control technology, more particularly, to a system and method for controlling fluid flow pressure and flow rate simultaneously.

2. Description of the Related Art

High pressure fluid flows may cause high fluid flow rates at the outlets of the fluid flowing pipelines, for example, in case of water flow, among others. Such high pressure or high flow rates may result in undesirable fluid mass losses at the outlets. Further, because of high pressure, a desired flow rate may not be achieved at various outlets of a pipeline network. As a result, there is non uniform distribution of fluid flow within a pipeline network. For example, in high rise buildings, one outlet at a particular floor may get more water than another outlet at a different floor. Similarly, taps at same floor draw different flow-rates due to different pressures at different taps.

According to conventional solutions, the problem of high pressure and high flow rate has been treated by the use of pressure reducing valves or flow control valves, respectively. These valves reduce or regulate either pressure or flow rate. Such valves are, in most cases, are complex equipment and may include moving parts. Some such devices may also require heavy maintenance.

Moreover, such conventional devices are usually expensive and may be prohibitive to install in most common applications. Further, such devices may be unable to reduce pressure and the flow rate simultaneously.

Accordingly, there exists a need for an improved system and method for controlling fluid flow pressure and/or flow rate.

SUMMARY

A device for managing fluid flow pressure and flow rate is disclosed. The device includes a first orifice plate, a second orifice plate, and a tubular structure. The first orifice plate includes a first orifice of a first diameter (d1) and the first orifice is positioned near an edge of the first orifice plate. The second orifice plate includes a second orifice of a second diameter (d2) and the second orifice is positioned near an edge of the second orifice plate. The tubular structure has an effective diameter (D) comprising the first orifice plate and the second orifice plate placed at perpendicular direction to the fluid flow within the tubular structure, separated by an optimum distance (X).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
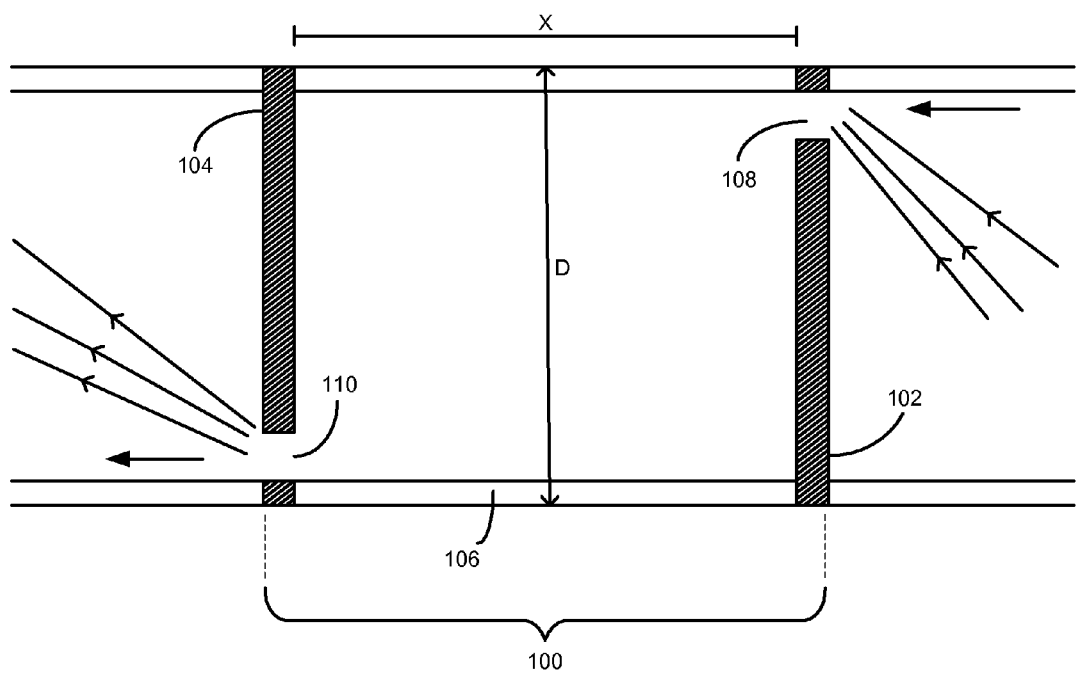
FIG. 1 illustrates a device for controlling fluid pressure and flow rate in accordance with an embodiment of the present invention.

FIG. 1 illustrates a device 100 for controlling fluid pressure and flow rate in accordance with an embodiment of the present invention. The device 100 includes a first orifice plate 102, a second orifice plate 104, and a tubular structure 106.

The first orifice plate 102 has a first orifice 108 having a first diameter d1. The first orifice 108 is positioned near an edge of the first orifice plate 102. The second orifice plate 104 has a second orifice 110 having a second diameter d2. The second orifice 110 is positioned near an edge of the second orifice plate 104. The tubular structure 106 has an effective diameter (D). In various embodiments, the first orifice diameter d1, and the second orifice diameter d2 are substantively the same. As illustrated by the figures, the tubular structure 106 houses the first orifice plate 102 and the second orifice plate 104 such that the first orifice plate 102 and the second orifice plate 104 are placed in a generally perpendicular direction to the fluid flow within the tubular structure 106.

According to certain embodiments, the first orifice 108 is positioned near the edge of the first orifice plate 102 and the second orifice 110 is positioned near the edge of the second orifice plate 104. According to the embodiment illustrated by FIG. 1, for example, the first orifice 108 and the second orifice 110 are positioned such that they are diagonally opposite to each other within the tubular structure 106. The first orifice plate 102 and the second orifice plate 104 are separated by a distance X within the tubular structure 106. In some embodiments, the distance X is dependent on the first diameter d1 and/or the second diameter d2. In some embodiments, the distance X is preferably equal to 6 times of the first diameter (d1) and/or 6 times of the second diameter (d2) for achieving an optimized reduction in pressure and flow rate of the fluid flow down stream the device. In some other embodiments, the distance X is also dependent on fluid physical characteristics and chemical characteristics. The fluid physical characteristics are viscosity, temperature, surface tension, dielectric constant, density, and the like.

In operation, and as illustrated by FIG. 1, fluid flow enters the device 100 through the first orifice 102, passes through the tubular structure 106 and exits from the second orifice 104. Before entering the device 100, the fluid has an upstream pressure and an upstream flow rate. While traversing the device 100 according to various embodiments as discussed above, the fluid flow advantageously suffers a drop in pressure or flow rate or both. Accordingly, the fluid flow has a downstream pressure and downstream flow rate after the fluid flow exits the device 100, and the downstream pressure and the downstream flow rate are lower than the upstream pressure and the upstream flow rate. According to various embodiments, the downstream pressure and the downstream flow rate are configurable depending on the first orifice diameter d1 and/or the second orifice diameter d2.

According to some embodiments, the first orifice 108 and the second orifice 110 (or "the orifices")have a straight edge, that is, the boundary of the first orifice 108 and the second orifice 110 are substantially perpendicular to the plane of the first orifice plate 102 and the second orifice plate 104 (or "the orifice plates"), respectively. In other embodiments, the orifices may have tapered or curvilinear edges. In some embodiments, the orifice plates have an equal thickness. The thickness of the orifice plates depends on the upstream pressure of the fluid and the material of the orifice plates and the tubular structure. In one embodiment, the first orifice plate 102 and the second orifice plate 104 have a thickness of 3 mm for the upstream pressure up to 14 kg/cm$^2$, in a tubular structure of the effective diameter (D) of 13 mm. Those skilled in the art will appreciate that the first orifice plate 102 and the second orifice plate 104 may have different thickness for withstanding the upstream pressure and the upstream flow rate.

The first orifice plate 102 and the second orifice plate 104 are constructed from a fluid impermeable material. In some embodiments, the first orifice plate 102 and the second orifice plate 104 are constructed from the material similar to the material of the tubular structure 106. According to various embodiments, the orifice plates 102, 104 and the tubular structure 106 comprises one or more metallic materials including copper, bronze, zinc, iron, among others. In certain other embodiments, the orifice plates 102, 104 and the tubular structure 106 may comprise one or more suitable plastic materials generally known in the art.

While the various embodiments have been described with respect to water as a fluid, those of ordinary skill in the art will appreciate that the fluid can be any other liquid or a gas or any other such substance showing similar properties. Further, the distance X between the two orifice plates 102, 104 may also be variable based on the viscosity and density of the fluid.

In some embodiments, the tubular structure 106 has cross sectional shapes selected from one or more of a circle, an ellipse, a rectangle, a polygon or any other cross-section pattern. All such shapes and cross sections are included within the scope and spirit of this invention embodied by the claims. For a circular cross section, the effective diameter is the circular diameter D. However, in case of other shapes, an effective diameter D may be defined. For example, the effective diameter D may be the diameter of a circle having an area equal to the area of the tubular structure 106 cross section. for circular shape (diameter D). Those skilled in the art will appreciate that the first orifice plate 102 and the second orifice plate 104 will accordingly conform to the shape of the tubular structure 106, and therefore may have a corresponding cross section shape as discussed above. According to certain embodiments, the diameter D is between four to six times the orifice diameters 108, 110 (d1,d2).

As discussed, while traversing through the device 100, the fluid flow registers a loss in upstream pressure and flow rate. One or more device 100 may be installed in a series combination in a fluid flow stream to obtain a desirable downstream pressure and/or a downstream flow rate. In certain other embodiments, a combination of series and parallel arrangements of multiple devices such as the device 100 may be used. The two orifice plates 102, 104 separated by a distance X advantageously allow for an optimal reduction of pressure and flow rate incident on the device. According to one embodiment, the pressure reduction for an incident pressure of 14 kg/cm$^2$ is reduced to 1 kg/cm$^2$ thereby achieving pressure reduction ratio of 14:1. According to several other embodiments, higher pressure reduction ratios may be achieved by appropriately configuring the device 100 or a combination of devices similar to the device 100. Those of ordinary skill in the art will appreciate that the device 100 may have different shapes in accordance with the shapes of pipes to be coupled. Further, the device 100 allows for easy maintenance, retrofitting into an existing fluid flow stream such as a domestic water distribution and replaceability. Furthermore, due to the absence of any moving parts, the device 100 has a long operational life, and is easy to manufacture, and therefore offers solution to the fluid pressure and flow rate reduction in a significantly cost reduced manner.

Figure 2:
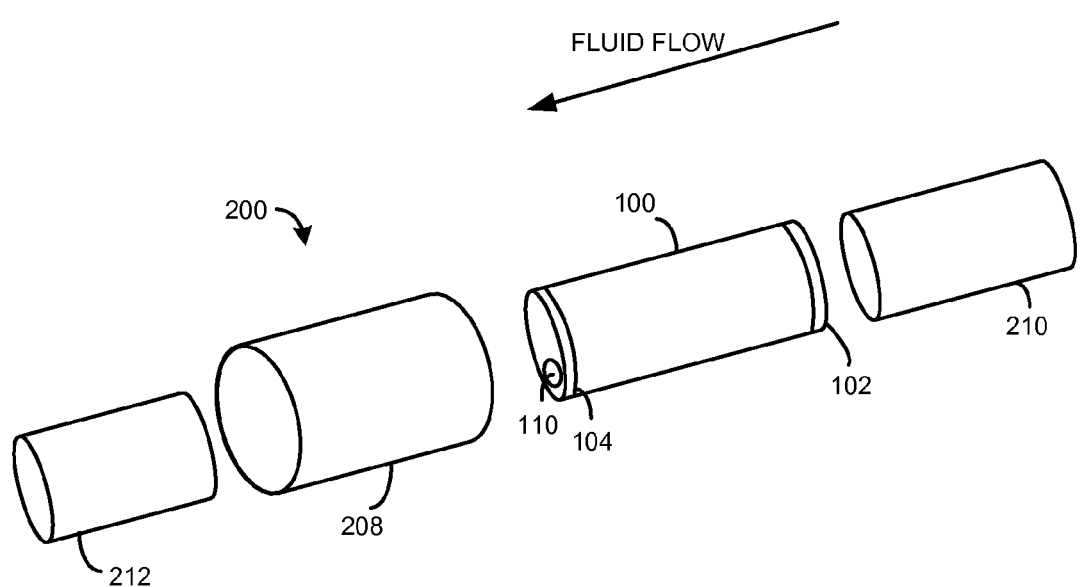
FIG. 2 illustrates a linear exploded view of an apparatus to control pressure and flow rate in accordance with an embodiment of the present invention.

FIG. 2 illustrates an apparatus 200 to control pressure and flow rate in accordance with an embodiment of the present invention. The apparatus 200 includes the device 100, a socket 208, a first pipe 210 and a second pipe 212. As mentioned in FIG. 1, the device 100 includes the first orifice plate 102, the second orifice plate 104, the first orifice 108 (not shown) on the first orifice plate 102, and the second orifice 110 on the second orifice plate 104. The first pipe 210 is coupled to the device 100 within the socket 208, and the second pipe 212 is coupled to the device 100 within the socket 208. A fluid flow is directed from the first pipe 210 to the second pipe 212. As further illustrated by FIG. 4, in operation, the device 100 is configured to rest within the socket 208.

Figure 3:
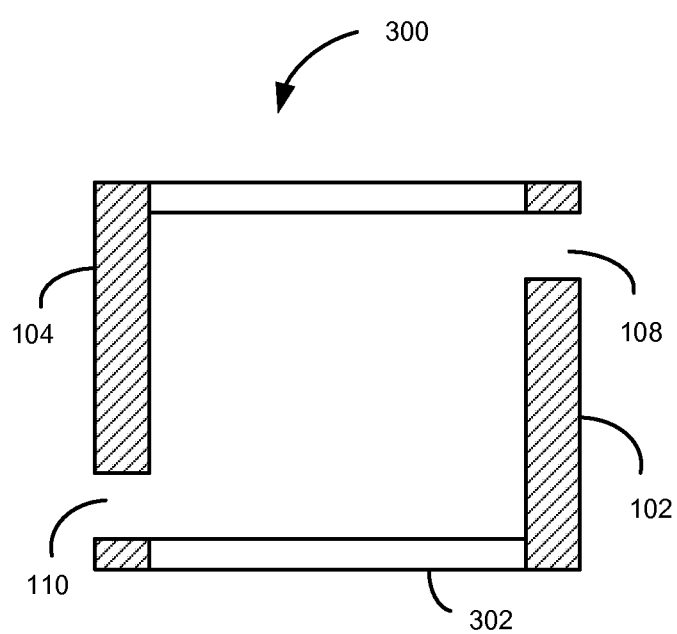
FIG. 3 illustrates a cross section view of a device to control pressure and flow rate in accordance with an embodiment of the present invention.

FIG. 3 illustrates a cross section view of the device 100 in accordance with an embodiment of the present invention. The device 100 includes a wall 302 having a thickness. Generally, the thickness of the device 100 is equal to the thickness of the first pipe 210 and the second pipe 212. However, the thickness of the device 100 may be increased to provide additional robustness. Additional support may also be provided by increasing the thickness of the socket 208 (see FIG. 2). According to one embodiment, the size of the first orifice 108 and the second orifice 110 may be varied according to a fluid pressure at an inlet of the device 100 and a flow rate required at the outlet of the device 100.

Figure 4:
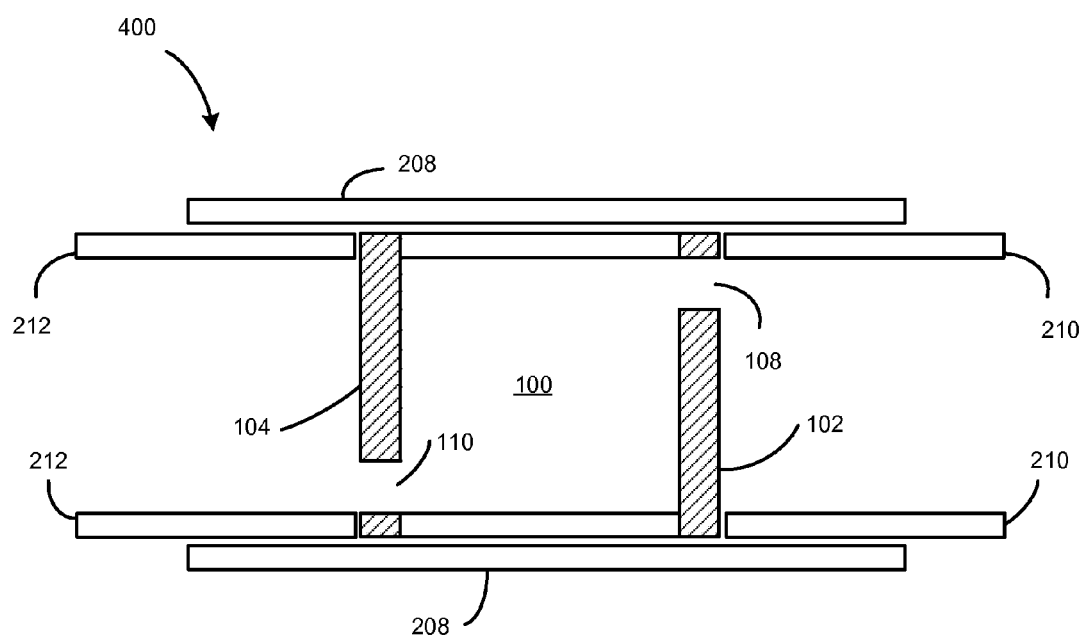
FIG. 4 illustrates a front cross sectional view of an assembled system to control pressure and flow rate in accordance with an embodiment of the present invention.

FIG. 4 illustrates a front cross sectional view of an assembled system 400 to control pressure and flow rate in accordance with an embodiment of the present invention. The system 400 includes the socket 208, the first pipe 210, the second pipe 212, the device 100, and the first orifice 108 and the second orifice 110 at the inlet and outlet of the device 100, respectively. It may be noted that the gaps between the orifices, pipes and the device 100 are exaggerated for illustrative purposes only, and usually the various components will be tight fitted with each other.

According to an embodiment of the present invention, the downstream flow rate varies with a change in diameter of the orifices 108, 110. According to another embodiment, the downstream flow rate at the outlet of the device 100 may vary directly proportional with a square root of the fluid pressure at the inlet of the device 100. Those of ordinary skill in the art will appreciate that more than one orifice, similar to, for example, the orifices 108, 110, may be used on either side of the device 100 (on the orifice plates 102, 104) in order to obtain a desired fluid pressure and desired flow rate at the outlet of the device 100. In general, the reduction in pressure and flow rate of the fluid flow across the device 100 is in substantively equal proportions. Therefore a substantial reduction in flow rate will be accompanied with a substantial reduction in the downstream pressure.

Although the various illustrated embodiments have been directed towards pipe flows for domestic water distribution, those skilled in the art will appreciate that similar devices similar to the device 100 may be configured for several other fluid flow applications in which a pressure and flow rate reduction is required. For example, devices similar to the device 100 may be appropriately configured for applications such as dams, commercial water tankers, industrial water supply and the like. The devices may be arranged in various combinations either in series or in parallel and/or in both serial and parallel configurations to provide a desired output of pressure and flow rate. Further, the device 100 may be fitted with an additional orifice plate to achieve even further reduction in mass flow and pressure control.

According to certain contemplated embodiments, the device 100 may be configured to regulate the flow of air into a furnace at a desired pressure and flow rate to aid complete and efficient combustion, that is, to achieve maximum efficiency from combustion of a fuel and reduction of gaseous and suspended pollutants in flue gas, potentially earning of Carbon Credits.

According to another contemplated embodiments, the flow rate and pressure reducing design of the device helps in arresting the suspended pollutants from the flue gas by reducing the velocity of suspended pollutants. This helps in reducing load on the sensitive devices like Electronic Precipitators and the like.

In yet other contemplated embodiments, the device can regulate the flow of air into the any type sewerage treatment plant like Activated Sludge Process to accelerate the process of aerobic biodegradation and earning of Carbon Credits. In other embodiments, the device regulates the flow of air (forced) into the windrow piles to accelerate the process of aerobic biodegradation of Organic (agricultural waste)/Municipal Solid Waste and solution to treatment of leachate.

As discussed, embodiments of the device are helpful in water management of any water distribution systems having water dispensed at a high pressure or flow rate. For example, the water distribution in buildings and houses, industries, irrigation, hilly areas among various others, According to yet another contemplated embodiment, the device is usable as a safety device. For example, in case of a boiler burst, every thing near to a boiler may get burnt due to massive and uncontrolled flow of steam (loss of property and in some cases human life). Installing the device as a pressure fail safe device may significantly reduce the potential damage in such situations.

In other embodiments, the device can be configured for use in distillation plants to increase their efficiency, for example, oil refineries, braveries plants etc.

Other applications of the device exist in automotive, aviation, shipping and submarine industries. For example, the device can be used to regulate the air flow in any type of two strokes or four strokes engine, to enhance the performance/fuel efficiency of an engine and reduction of gaseous and suspended pollutants in flue gas and earning of carbon credits. The device can be used as a brake in the aeroplane, ship and submarine etc. The device can be used to regulate the intake/out flow of water at various depths in a sea for a submarine, to make it more users friendly. The device can be used to dissipate the energy of steam/water coming out from a turbine, used for production of electricity in thermal power plant/Dam etc. The device can be used to dissipate the energy of water falling from any height (water fall etc.). The device will ensure the safety of a dam from a failure due to erosion of sub-soil beneath a dam.

The device can be used to absorb the shock in shockers to be installed in the motorcycle, car, bus, truck etc. This device can also be used to absorb the shock due to collision of two vehicles.

The device can be used to arrest the sand particles in windy sand flows.

In metros, the water is generally supplied at a desired flow rate. There is heavy illegal usage of water; as the users install mono block pumps to arrest more water from water main(s).This device can be installed at the appropriate point to arrest the illegal water usage as the device regulates the fluid pressure and flow rate, drastically.

The device can be used at any place where there is a need to regulate the pressure and flow rate simultaneously.

In the foregoing specification, specific embodiments of the present invention have been described. However, those skilled in the art will appreciate that various modifications and changes can be made without departing from the spirit and scope of the present invention as set forth in the various embodiments discussed above. Especially, the embodiments disclosed above describe a simple yet effective device for reduction of pressure and flow rate of a fluid flow, and the device is easily configurable (by scaling up, for example) for different applications. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements as described herein.

The invention claimed is:

1. A device for managing pressure and flow rate of a fluid comprising:
    a first orifice plate having one first orifice, the one first orifice having a first diameter (d1), the one first orifice positioned near an edge of the first orifice plate;
    a second orifice plate having one second orifice, the one second orifice having a second diameter (d2), the one second orifice positioned near an edge of the second orifice plate; and
    a tubular structure having an effective diameter (D) comprising the first orifice plate and the second orifice plate placed at perpendicular direction to the fluid flow within the tubular structure, separated by a distance (X),
    wherein the pressure and/or the flow rate downstream of the device are lower than the pressure and/or flow rate upstream of the device and wherein the one first orifice and the one second orifice effect the lowering of the pressure and/or flow rate
    wherein the distance (X) between the first orifice plate and the second orifice plate is dependent on the first diameter (d1) and/or the second diameter (d2);
    and wherein the first orifice plate and the second orifice plate have a thickness of about 3 mm for the upstream pressure up to 14 kg/cm$^2$ in a tubular structure having an effective diameter (D) of 13 mm.

2. The device of claim 1, wherein the one first orifice is positioned near the edge of the first orifice plate and the one second orifice is positioned near the edge of the second orifice plate, such that the first orifice and the second orifice are positioned to be diagonally opposite with respect to each other within the device.

3. The device of claim 1, wherein the first diameter and the second diameter are equal.

4. The device of claim 1, wherein the distance (X) is preferably equal to 6 times of the first diameter (d1) or 6 times of the second diameter (d2).

5. The device of claim 1, wherein the pressure and the flow rate at the down stream is dependent on the first diameter (d1) and/or the second diameter (d2).

6. The device of claim 1, wherein the first orifice and the second orifice are straight edged.

7. The device of claim 1, wherein the thickness of the first orifice plate and the second orifice plate depends on an upstream pressure of the fluid flow rate and the material of the tubular structure, the first and the second orifice plates.

8. The device of claim 1, wherein the effective diameter (D) is about 4 to about 6 times the first orifice diameter (d1) or the second orifice diameter (d2).

9. The device of claim 8, wherein the material comprises one or more of copper, bronze, iron, or metallic material.

10. The device of claim 1, wherein the pressure and the flow rate down stream of the device depend on the first orifice diameter (d1) and/or the second orifice diameter (d2).

11. The device of claim 1, wherein the distance between the two orifice plates is dependent on fluid physical characteristics and chemical characteristics.

12. The device of claim 11, wherein the fluid physical characteristics are selected from a group comprising viscosity, temperature, surface tension, dielectric constant, and density.

13. The device of claim 1, wherein the fluid comprises a liquid and/or a gas.

14. The device of claim 1, wherein the tubular structure comprises a cross sectional shape selectable from one of a circle, an ellipse, a polygon or an irregular cross section.

15. The device of claim 1, wherein the first orifice plate and the second orifice plate are configured to be removably fixed within the tubular structure and wherein the first orifice plate and the second orifice plate are rigidly fixed within the tubular structure.

16. An apparatus for managing pressure and flow rate of fluid flow comprising: an inlet for receiving the incoming fluid flow; a device operatively coupled to the inlet, the device comprising: a first orifice plate having one first orifice, the one first orifice having a first diameter (d1), the one first orifice positioned near an edge of the first orifice plate, a second orifice plate having one second orifice, the one second orifice having a second diameter (d2), the one second orifice positioned near an edge of the second orifice plate, a tubular structure having an effective diameter (D) comprising the first orifice plate and the second orifice plate placed at perpendicular direction to the fluid flow within the tubular structure, separated by a distance (X); and an outlet for releasing the fluid flow, wherein the distance (X) between the first orifice plate and the second orifice plate is dependent on the first diameter (d1) and/or the second diameter (d2) and wherein the first orifice plate and the second orifice plate have a thickness of about 3 mm for, the upstream pressure up to 14 $kg/cm^2$ in a tubular structure having an effective diameter (D) of 13 mm.

17. The apparatus of claim 16, wherein the distance (X) is preferably equal to 6 times of the first diameter (d1) or 6 times of the second diameter (d2).

18. The apparatus of claim 16, wherein the pressure and the flow rate at the down stream is dependent on the first diameter (d1) and/or the second diameter (d2).

19. The apparatus of claim 16, wherein the effective diameter (D) is about 4 to about 6 times the first orifice diameter (d1) or the second orifice diameter (d2).

20. A method of manufacturing a device for controlling pressure and flow rate of a fluid flow, the method comprising: providing a tubular structure having a diameter (D); providing a first orifice plate having one first orifice rigidly fixed to an inlet edge of the tubular structure; and providing a second orifice plate having one second orifice rigidly fixed to an outlet edge of the tubular structure, wherein the first orifice plate and the second orifice plate are placed perpendicular to the fluid flow direction within the tubular structure, separated by an optimum distance (X), wherein the distance (X) between the first orifice plate and the second orifice plate is dependent on the first diameter (d1) and/or the second diameter (d2), and wherein the first orifice plate and the second orifice plate have a thickness of about 3 mm for the upstream pressure up to 14 $kg/cm^2$ in a tubular structure having an effective diameter (D) of 13 mm.

* * * * *